United States Patent Office 3,351,520
Patented Nov. 7, 1967

3,351,520
POLY - β - ASPARAGINEPOLYALKYLENEPOLY-AMINE HALOHYDRIN RESINS AND APPLICATION THEREOF IN PRODUCTION OF WET STRENGTH PAPER AND FLOCCULATION OF SOLIDS
John C. Spicer, Sidney, N.Y., and Paul M. Westfall, St. Albans, and Nelson R. Eldred, South Charleston, W. Va., assignors to Union Carbide Corporation, a corporation of New York
No Drawing. Filed Nov. 13, 1964, Ser. No. 411,143
11 Claims. (Cl. 162—164)

ABSTRACT OF THE DISCLOSURE

Cationic water-soluble resinous compositions of particular utility as wet-strength agents for paper are produced by reacting a polyalkylenepolyamine with a half ester of maleic acid and partially cross-linking the resulting product with a polyfunctional halohydrin. A typical example is the resin produced by reacting tetraethylenepentamine with monomethyl maleate on a mole for mole basis at a temperature of about 125° C. and then reacting the resulting product with epichlorohydrin in an amount of three moles per mole of tetraethylenepentamine at a temperature of about 60° C.

---

This invention relates to novel cationic water-soluble resinous compositions. More particularly, this invention relates to novel poly-β-asparaginepolyalkylenepolyamine resins having particular utility in flocculating solid matter in aqueous anionic suspensions and in the production of paper products with materially improved physical properties. In a specific aspect, this invention relates to the incorporation of the poly-β-asparaginepolyalkylenepolyamine resins in paper products as wet-strength improving agents and comprehends both the improved paper products and methods of producing such products from aqueous suspensions of cellulosic paper-making fibers.

Conventional cellulosic paper products lose their strength rapidly when wetted; for example, the wet strength of ordinary paper is only about five to ten percent of its dry strength. To overcome this disadvantage, various methods of treating paper products have been suggested in the past. Thus, wet strength can be increased by parchmentizing paper in sulfuric acid solution or by surface-sizing with animal glue and exposing the glue-sized sheet to high temperatures or to a tanning agent to render the protein insoluble in water. Additionally, various resins such as the urea-formaldehyde and melamine-formaldehyde resins, among others, have been employed to enhance wet strength. Many of these prior art methods suffer from serious disadvantages. Thus, the absorbency of the paper may be reduced, or increased stiffness and harshness result, while in some instances the deterioration rate of the paper is increased. Moreover, many serious practical difficulties have been found to arise in the commercial application of such treatments in paper mills.

Resins which are substantive to fibers of hydrated cellulosic material such as aqueous suspensions of paper-making fibers, and can thus be readily applied in the dilute aqueous suspensions encountered in paper mills, are known to the art. Among the resins of this type which have been employed heretofore are the resins produced by reaction of polyalkylenepolyamines with halohydrins or by reaction of polyalkylenepolyamines with saturated aliphatic dibasic carboxylic acids to produce a first stage resin with subsequent reaction of this first stage resin with the halohydrin. The latter resins are highly effective in improving wet strength but exhibit an undesirable tendency to adhere to the forming wire, press rolls and drying cylinder in paper-making processes. Most recently, related resins have been produced by reaction of polyalkylenepolyamines with unsaturated aliphatic di- or polycarboxylic acids, or mononuclear aromatic polycarboxylic acids, followed by reaction of the resulting polyamide with a halohydrin. These resins, though capable of imparting a high degree of wet strength to paper, exhibit, in many instances, an undesirable black color which makes them unsuitable for use in treatment of paper products without resort to costly and time consuming methods of decolorizing.

It has now been found that poly-β-asparaginepolyalkylenepolyamines produced by the process hereinafter described are capable of providing marked improvement in the wet strength of paper, and related products produced from cellulosic fibers, while avoiding the difficulties encountered in the prior art with other resins possessing substantive properties for cellulosic fibers. The novel poly-β-asparaginepolyalkylenepolyamines of this invention are capable of providing wet strength at least equal to that of any of the resins of the prior art as well as improving the dry strength of paper and paper products. They function effectively at low levels of addition and over a wide pH range, are free of undesirable dark coloration and do not tend to stick to the forming wire, press rolls and drying cylinder to the degree that has been encountered with certain of the resins of the prior art. In addition to their use as wet and dry strength improving agents, the novel poly-β-asparaginepolyalkylenepolyamines disclosed herein find further important application as retention aids, drainage rate improvers, flocculents, white water clarifiers, and so forth.

The cationic water-soluble resins of this invention are produced in a two-stage process. The first stage resin is the product produced by reacting a polyamine with a maleic acid ester of the structure hereinafter disclosed, while the second stage resin is the product resulting from partial cross-linking of the first stage resin with a halohydrin.

The suitable polyamines for the purpose of this invention are the polyalkylenepolyamines having at least two primary amine groups and at least one secondary amine group. The nitrogen atoms in such polyamines are linked by —$C_mH_{2m}$— groups, wherein $m$ is a small integer such as 2, 3 or 4, and the molecule may contain from 2 to up to about 8 of such groups. Commercially available polyalkylenepolyamines, which are mixtures of linear, branched and cyclic polyalkylenepolyamines, are entirely suitable for use in producing the novel resinous compositions of this invention. Accordingly, the term "polyalkylenepolyamine" as employed herein and in the appended claims is intended to include polyalkylenepolyamines in pure or relatively pure form, mixtures of such materials, and crude polyalkylenepolyamines which are commercial products and may contain minor amounts of other compounds. Illustrative of the suitable polyalkylenepolyamines one can mention the polyethylenepolyamines such as diethylenetriamine, triethylenetetramine, tetraethylenepentamine, pentaethylenehexamine, N - (2 - aminoethyl)-piperazine, N,N - bis(2 - aminoethyl)ethylenediamine, diaminoethyl triaminoethylamine, piperazinoethyl triethylenetetramine, and the like. The corresponding polypropylenepolyamines and polybutylenepolyamines can also be employed although the polyethylenepolyamines are preferred for economic reasons.

To prepare the first stage resin of this invention, the above-described polyalkylenepolyamine is reacted with a maleic acid ester of the general formula:

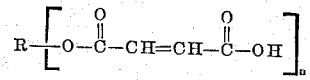

wherein n is an integer having a value of from 1 to 6, and preferably from 1 to 3, and R is the hydrocarbon residue of an aliphatic alcohol containing 1 to 8 carbon atoms and has a valence equal to n. Compounds of the structural formula given above are readily produced by reaction of maleic anhydride with a monohydric or polyhydric aliphatic alcohol, either saturated or unsaturated and either acylic or alicyclic, of 1 to 8 carbon atoms. Illustrative of the suitable aliphatic alcohols, one can mention methyl alcohol, ethyl alcohol, isopropyl alcohol, n-butyl alcohol, sec-butyl alcohol, n-hexyl alcohol, n-heptyl alcohol, n-octyl alcohol, allyl alcohol, crotyl alcohol, cyclopentanol, cyclohexanol, ethylene glycol, propylene glycol, trimethylene glycol, tetramethylene glycol, pentamethylene glycol, hexamethylene glycol, glycerol, trimethylol propane, pentaerythritol, arabitol, sorbitol, mannitol, and the like.

When a saturated monohydric acyclic aliphatic alcohol such as methyl alcohol is reacted with maleic anhydride the resulting product is a monoalkyl maleate, i.e., a compound of the formula:

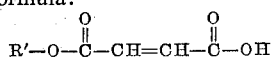

wherein R' is an alkyl group. The monoalkyl maleates of the above formula wherein R' is an alkyl group of 1 to 6 carbon atoms are preferred for the purposes of this invention and monomethyl maleate is particularly preferred. Illustrative of the products resulting from reaction of maleic anhydride with a dihydric aliphatic alcohol is the reaction product with ethylene glycol which has the formula:

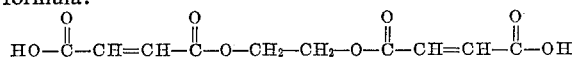

while the reaction product with trimethylol propane which has the formula:

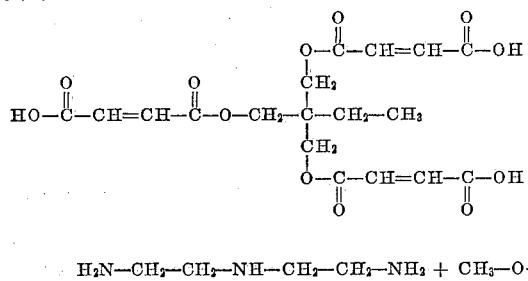

typifies products resulting from reaction of maleic anhydride with a trihydric aliphatic alcohol.

In accordance with this invention, the first stage resin is produced by reacting the polyalkylenepolyamine and the maleic acid ester described hereinabove in an amount of from about 0.5n to about 2n moles of polyalkylenepolyamine per mole of maleic acid ester, where n, as previously defined, designates the number of

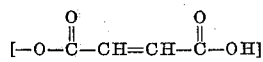

groups in the maleic acid ester and is an integer of from 1 to 6 and preferably from 1 to 3. The reaction is carried out at a temperature of from about 60° C., or less, to about 150° C. for a period of at least about 30 minutes, and more generally at least about 90 minutes. Longer reaction periods of up to 6 hours or more may be employed if desired without detrimental effect and may in some instances be necessary to complete the reaction. The product produced under these conditions is a hard, brittle, porous material, pale yellow in color. Higher temperatures than those specified tend to give dark colored resins unsuitable for use in paper products because of their color, while lower temperatures are undesirable where the resin is to be employed as a wet strength agent since they tend to result in resins which are less effective for this purpose. It is preferred to employ a proportion of about 0.8n to about 1.4n moles of polyalkylenepolyamine per mole of the maleic acid ester, while first stage reaction temperatures of about 115° C. to about 135° C. have been found to give a product with optimum characteristics as a wet strength agent.

The exothermic reaction of the maleic acid ester with the polyalkylenepolyamine can be carried out without the use of a solvent but it is preferred to employ a solvent in order to facilitate control of the reaction. Suitable solvents include water, benzene, 1,4-dioxane, pyridine, lower alkanols of 1 to about 4 carbon atoms such as methanol, ethanol, isopropanol, n-butanol, etc., and the like. A particularly convenient procedure is to prepare the maleic acid ester as a preliminary step to formation of the first stage resin and to utilize an excess of the alcohol in the reaction with maleic anhydride so that the unreacted alcohol can serve as a solvent for the subsquent reaction with the polyalkylenepolyamine.

The reaction of a polyalkylenepolyamine with a maleic acid ester of the structure disclosed hereinabove, at a temperature within the range specified for the first stage reaction, results in the formation of a poly-β-asparagine-polyalkylenepolyamine. The reaction involves both amidation and addition of the amine to the carbon-carbon double bond of the maleic acid ester and is thus distinct from the reaction that occurs between a polyalkylenepolyamine and maleic acid, which reaction leads to the formation of a salt which requires temperatures above those utilized in the first stage reaction of this invention to convert it to an amide. Such high temperatures have been found to lead to the formation of an undesirable black colored resin that is not suited for use in most applications of a wet strength agent because of its color. In the maleic acid esters of the formula disclosed herein the presence of the ester group increases the activity of the carbon-carbon double bond to permit a smoth nucleophilic addition of an amine thereto. As illustrative of the general reaction equation, the reaction between monomethyl maleate and diethylenetriamine can be represented as follows:

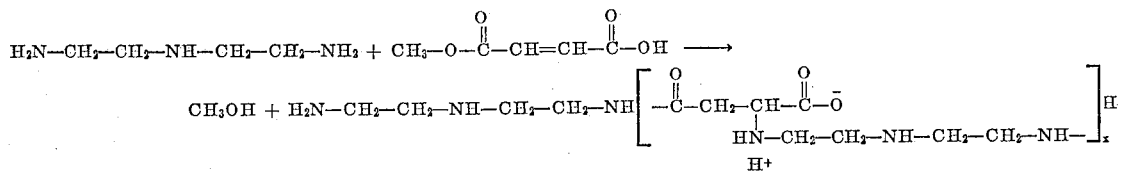

where x represents the number of repeating units in the polymer chain. From the equation shown above, it is apparent that only two moles of diethylenetriamine can react with each mole of monomethyl maleate since the carboxyl group of the monomethyl maleate is tied up by intramolecular salt formation (Zwitter ion formation). Experiments confirm this since the same product is obtained at a mole ratio of amine to monomethyl maleate of higher than 2 to 1 as at a mole ratio of 2 to 1. Infrared and ultraviolet analyses of the first stage resin produced by reaction of a polyalkylenepolyamine and monomethyl maleate showed that there was no conjugated unsaturation present, in contrast with the resin of the prior art based on reaction between a polyalkylenepolyamine and an unsaturated acid such as maleic acid, and were consistent with the structure of a poly-β-asparaginepolyalkylenepolyamine. Melting point determinations and elemental analysis confirmed this structure.

The second stage resin of this invention is a partially cross-linked poly-β-asparaginepolyalkylenepolyamine with the cross-linking taking place primarily through secondary amine groups of the first stage resin. It is produced by diluting the product of the first stage reaction with water or other suitable diluent such as methanol, ethanol, 1,4-dioxane, and the like, and then reacting it with a polyfunctional haloydrin. The suitable halohydrins are the dihalohydrins such as α-γ-dichlorohydrin, dibromohydrin, and di-iodohydrin and monohalohydrins which contain in addition to the halogen a functional group such as an epoxy group which is capable of combining with an amine group. Illustrative of this latter class of halohydrins one can mention epichlorohydrin, epibromohydrin, epi-iodohydrin, di-epi-iodohydrin, 1,3-dichloro-2-propanol, 1,3-dibromo-2-propanol, and the like. For economic reasons and also because of the particularly desirable results obtained thereby, it is preferred to employ epichlorohydrin in this invention.

The amount of the polyfunctional halohydrin employed in the second stage reaction is an amount sufficient to provide a molar ratio of halohydrin to secondary amine groups of the first stage resin of about 0.5 to about 1.5, and more preferably from about 0.8 to about 1.1. Suitable reaction temperatures for the second stage reaction are in the range from about 20° C., or less, to about 100° C., or more, and preferably within the range from about 40° C. to about 80° C. In carrying out the second stage reaction, the first stage resin is first diluted with a suitable diluent, as described above, to a solids content of from about 5 to 35 percent by weight, more preferably from about 15 to 25 percent by weight, and then the polyfunctional halohydrin is added.

The time required for the second stage reaction will vary from a relatively long period such as about 24 hours, or more, at the lower reaction temperatures to a relatively short period such as about 10 minutes, or less, at the higher reaction temperatures. In general, the exothermic second stage reaction is continued until the product reaches a viscosity in the range between B and E on the Gardner scale, while the preferred procedure is to terminate the reaction when the viscosity reaches C–Gardner or D–Gardner. This is accomplished by cooling and diluting the resin, preferably with distilled water, to a solids content of about 20 percent or less. The dilute resin solution is then stabilized by adjusting the pH to a value of about 5 or less. This is conveniently accomplished by the addition of an appropriate quantity of acid such as concentrated hydrochloric acid, concentrated sulfuric acid, concentrated phosphoric acid, glacial acetic acid, and the like, or by addition of gaseous carbon dioxide. A considerable proportion of the second stage resin will consist of "inert" material, i.e., material that is ineffective in enhancing wet strength, as a result of the splitting off from the halohydrin of a hydrogen halide which reacts with the amine groups.

The second stage resin of this invention is a cationic water-soluble thermosetting resin that must be cured to a water-insoluble form subsequent to its incorporation in a paper product in order to effect an increase in wet strength. The curing period required to obtain wet strength is dependent on the temperature employed and to a lesser extent on the pH of the paper product. Wet strength may be obtained by allowing the treated paper to air dry at room temperature for a prolonged period, such as a period of 24 hours or more. Generally, the wet strength will continue to increase over about a 30-day period at room temperature before reaching its ultimate value. It is prefered, however, to accelerate the cure of the resin by heating the treated paper product. Such heating is suitably accomplished in the drying stage in the operation of a conventional paper making machine and modification of the normal drying conditions employed with such machines will not generally be necessary. Drying conditions encountered in commercial paper machine operation are, typically, temperatures of about 85° C. to about 135° C. for periods of about 1 to 4 minutes and such conditions are fully capable of effecting curing of the resins of this invention. Under such conditions the wet strength will continue to improve over a 20 to 30 day period and ultimately will reach about 70 to 80 percent of the strength that could be attained in the laboratory by use of a more prolonged curing period at comparable temperatures.

The wet-strength improving resins of this invention can be utilized in felted fibrous cellulosic materials, such as paper, paperboard, and shaped paper articles, formed from any suitable pulp including bleached and unbleached pulp. Suitable pulp includes sulfite, kraft, soda, groundwood, rag, rope, and jute pulp, etc. The pulp can contain a minor amount of conventional, synthetic papermaking fibers. Conventional fillers such as, for example, clay, calcium carbonate, titanium dioxide, talc, calcium silicate, barium sulfate, and the like, can also be incorporated in the paper product. The resins are effective in improving the wet strength of paper products when added to the cellulosic paper-making fibers in small amounts. Thus, the resin can be added in an amount of from about 0.05 percent, or less, to about 5 percent or more, based on the weight of the fibers, and is preferably employed in an amount of from about 0.5 percent to about 3 percent. The resin can be applied as a "tub-size," i.e., an aqueous solution of the resin can be applied to the sheeted paper by dipping, rolling, padding, etc., or at the beater or "wet-end" stage by introducing the resin to the aqueous paper-making furnish at any time prior to sheet formation. The wet strength papers of this invention can be employed in absorbent products such as toweling, facial tissue, and saturating papers and in sized and unsized products employed as packaging, paper bags, bond and envelope papers, and paperboard, or wherever paper of high wet strength finds suitable application.

The cationic resinous compositions of this invention have been found to overcome many of the shortcomings of the wet-strength resins of the prior art. Thus, the resins disclosed herein are highly efficient in increasing wet strentgh at low levels of addition, e.g., a wet strength of 30 percent or greater is frequently achieved at a level of addition of only about 1 percent, and may be used over a pH range of from about 4 to about 10. Paper properties such as absorbency, deterioration rate, and "hand" are not deleteriously affected. Additionally, paper pulp that has geen treated in accordance with this invention does not tend to stick to the forming wire, press rolls and drying cylinder, to the degree that has been encountered with certain of the commercial resins, which is obviously an important advantage in avoiding operating difficulties in a paper mill.

As hereinbefore disclosed, the poly-β-asparaginepolyalkylenepolyamine resins of this invention have many other uses in addition to their use as dry- and wet-strength improving agents for paper and paper products. Thus, for example, the resins are useful as drainage rate improvers, filler retention aids, and white water clarifiers (the term "white water" designates the effluent from a papermaking machine which consists of a suspension of paper-making fibers, fillers, etc.) in the manufacture of paper products and are of general applicability as flocculents for the flocculation of dispersed solid matter in aqueous anionic suspensions.

Among the suspensions which can be flocculated by use of the resins disclosed herein, there can be mentioned aqueous dispersions or slurries of silica, carbon, clay, biologically treated industrial wastes such as textile mill wastes, etc., sewage sludge, and the like. The poly-β-asparaginepolyalkylenepolyamine resins are employed as flocculents in accordance with this invention by admixing the resin in the suspension for which flocculation is desired in a concentration of from about 0.01 to about 5 percent by weight of the resin, based upon the weight of the solid dispersed phase. Preferably, resin concentrations of from about 0.1 to about 2.5 percent by weight are employed. The resins can be incorporated in the suspension in solid form and dissolved therein or can be introduced in the form of an aqueous solution.

The specific examples which follow are given to further illustrate the invention, it being understood that these examples are not intended to be limiting of the invention but merely illustrative thereof. Solids content values reported are in all cases in terms of active solids. In each instance the polyalkylenepolyamine employed was a commercial grade material and thus consisted of a mixture of linear, branched and cyclic compounds. Polyamine D and polyamine H are trade terms for commercially available materials which are complex mixtures of aliphatic and cyclic polyethylenepolyamines boiling above tetraethylenepentamine. Polyamine D has a molecular weight of 233, a density of 8.5 lbs. per gallon, a flash point of 380° F. and a pour point of —15° F. The principal components of polyamine D are pentaethylenehexamine, diaminoethyl triaminoethylamine, diaminoethyl triethylenetetramine, diaminoethyl diaminoethyl piperazine, piperazinoethyl triethylenetetramine, 4 - (N - piperazinoethyl) triethylenetetramine, bis-piperazinoethyl amine, and aminoethyl dipiperazinoethane. Polyamine H designates the still residue formed in the production of polyamine D and is thus a higher boiling mixture of polyethylenepolyamines.

*Example 1*

To a four-necked flask equipped with a mechanical stirrer, thermometer, dropping funnel, and distillation head there were charged 45.4 grams (0.24 mole) of commercial tetraethylenepentamine and then a solution formed by dissolving 19.6 grams (0.20 mole) of maleic anhydride in 100 milliliters of methanol, and refluxing on a steam bath for approximately 30 minutes to convert the maleic anhydride to monomethyl maleate, was added dropwise to the flask. The mixture was heated and the methanol distilled off and when the temperature in the flask reached 120° C. the system was evacuated to a pressure of 100 mm. of Hg and maintained under such conditions for 15 minutes and then further evacuated to a pressure of 15 to 20 mm. of Hg and maintained under such conditions for 30 minutes. The vacuum was then released and the flask temperature maintained between 120° C. and 125° C. for 1 hour and 45 minutes to form a poly-β-asparaginepolyethylenepolyamine, at which time the flask was cooled to 35° C. and the contents of the flask were dissolved in water and diluted to a concentration of 20 percent solids.

The 20 weight percent solution of poly-β-asparaginepolyethylenepolyamine was heated to 55° C. and then 59.9 grams (0.65 mole) of epichlorohydrin were added dropwise over a period of 15 minutes. The temperature was maintained at about 55° C. throughout the addition period by cooling and by controlling the rate of addition of the epichlorohydrin. After the addition of the epichlorohydrin the flask temperature was increased to 75° C. and maintained at this level until the solution attained a viscosity equivalent to C–Gardner at which point distilled water was added to dilute to a solids content of 3 percent and the pH was adjusted to 4.6 by addition of concentrated hydrochloric acid.

*Example 2*

To a 10-gallon glass-lined autoclave there were charged 8.5 lbs. (0.0448 lb. mole) of commercial tetraethylenepentamine and 8 lbs. of methanol and then a solution formed by dissolving 3.67 lbs. (0.0375 lb. mole) of maleic anhydride in 11 lbs. of methanol, and refluxing to convert the anhydride to monomethyl maleate, was added at a uniform rate over a 30-minute period. The system was then sealed under a nitrogen atmosphere, the kettle temperature was increased to 135° C. and the pressure to 110 p.s.i. and these conditions were maintained for a total of 5 hours. At the end of this period, 48.7 lbs. of distilled water were added and then 13.7 lbs. of methanol were removed by distillation and additional distilled water added to adjust the solids content to 20 percent. With the kettle temperature maintained between 55 and 60° C., 11.1 lbs. (0.12 lb. mole) of epichlorohydrin were added at a constant rate over a 1-hour period and then the kettle temperature was increased to 75° C. and maintained at this level until the mixture attained a viscosity of C–Gardner. The reaction product was then diluted with distilled water to 10 percent solids content and the pH was adjusted to 4.6 by addition of concentrated hydrochloric acid.

*Example 3*

Using the equipment described in Example 1, 34.6 grams (0.24 mole) of commercial triethylenetetramine were reacted with 26 grams (0.20 mole) of monomethyl maleate in 100 milliliters of pyridine. During the addition the temperature was maintained between 40 and 50° C. and then the kettle temperature was increased to 110° C. and maintained at this level for 3 hours. The pyridine was then removed under atmospheric pressure until the kettle temperature reached 120° C. whereupon the system was evacuated to a pressure of 100 mm. of Hg for 15 minutes and then further evacuated to a pressure of 15 to 20 mm. of Hg for 30 minutes. After diluting with distilled water to a solids content of 20 percent, 38.8 grams (0.42 mole) of epichlorohydrin were added dropwise with the temperature held at 55 to 60° C. by varying the rate of addition. Upon completion of the addition of the epichlorohydrin, the kettle temperature was increased to 75° C. and maintained at this level until the mixture attained a viscosity equal to C–Gardner, at which point distilled water was added to give a solids content of 1 percent and the pH was adjusted to 4.6 by addition of concentrated hydrochloric acid.

*Example 4*

Using the equipment described in Example 1, 34.6 grams (0.24 mole) of commercial triethylenetetramine were reacted with 26 grams (0.20 mole) of monomethyl maleate in 100 milliliters of benzene. During the addition, the temperature was maintained between 45 and 55° C. and then the kettle temperature was increased to 125° C. and the system was evacuated to a pressure of 100 mm. of Hg for 15 minutes and then further evacuated to 15 to 20 mm. of Hg for 30 minutes. The temperature was maintained at 120 to 125° C. for an additional 1 hour and 45 minutes and then the mixture was cooled below 100° C. and 194 milliliters of distilled water were added, followed by dropwise addition of 39.8 grams (0.43 mole) of epichlorohydrin with the temperature maintained at 50 to 55° C. Upon completion of the addition of the epichlorohydrin, the kettle temperature was increased to 75° C. and maintained at this level until the mixture attained a viscosity equal to C–Gardner, at which point distilled water was added to give a solids content of 1 percent and the pH was adjusted to 4.6 by addition of concentrated hydrochloric acid.

*Example 5*

Using the equipment described in Example 1, 34.6 grams (0.24 mole) of commercial triethylenetetramine were reacted with 26 grams (0.20 mole) of monomethyl maleate without the aid of a solvent. The monomethyl maleate was added dropwise to the triethylenetetramine with the temperature maintained at 45 to 55° C. by varying the rate of addition and then the kettle temperature was increased to 110° C., at which point methanol produced by the reaction began to distil. The temperature was increased to 125° C. and the system evacuated to a pressure of 100 mm. of Hg for 15 minutes and then further evacuated to a pressure of 15 to 20 mm. of Hg for 30 minutes. After releasing the vacuum and maintaining the temperature at 125° C. for an additional 1 hour and 45 minutes, distilled water was added to give a solids content of 20 percent. With the temperature maintained at 55 to 60° C. by rate of addition, 38.9 grams (0.42 mole) of epichlorohydrin were added dropwise. Upon completion of the addition of the epichlorohydrin, the kettle temperature was increased to 75° C. and maintained at this level until the mixture attained a viscosity equal to C–Gardner, at which point distilled water was added to give a solids content of 1 percent and the pH was adjusted to 4.6 by addition of concentrated hydrochloric acid.

Examples 6 to 10

Using the same equipment and in a similar manner to that described in Example 1, poly-β-asparaginepolyalkylenepolyamine resins were prepared from various polyalkylenepolyamines and monoalkyl esters of maleic acid. In each instance, the monoalkyl ester was prepared by heating 0.20 mole of maleic anhydride in 100 milliliters of the alcohol, the first stage resin was diluted to 20 percent solids with distilled water and reacted with epichlorohydrin, and the second stage resin was diluted with distilled water and the pH adjusted to 4.6 by addition of concentrated hydrochloric acid. Temperatures for the first and second stage reactions were the same as those of Example 1, while other conditions are reported in Table I below:

designated herein as numbers 11–B and 11–C were prepared by replacing the methanol by an equal weight of ethanol and 1,4-dioxane respectively.

In order to evaluate the effect of variation in the method of reducing the final pH to the desired level, a second stage resin was prepared using distilled water as the diluent for the second stage reaction (solids content of 20 percent) with the reaction with epichlorohydrin being continued for 1 hour and 38 minutes to give a product with a viscosity of C–Gardner. Using a 1 percent solids content product in each instance, resins designated herein as numbers 11–D, 11–E, 11–F and 11–G were prepared by adjusting the pH to 4.6 by the use of concentrated hydrochloric acid, glacial acetic acid, concentrated sulfuric acid and concentrated phosphoric acid respectively while a resin designated herein as 11–H was prepared by adjusting the pH to 4.8 using gaseous $CO_2$.

Example 12

To a 4-oz. bottle there were charged 16.5 grams of the first stage reaction solution of Example 11, 52 grams of distilled water and 6.9 grams of epichlorohydrin. The

TABLE I

| Example No. | Polyalkylenepolyamine | Moles | Alcohol | Second Stage Reaction ||| Solids Content of Product, percent |
|---|---|---|---|---|---|---|---|
| | | | | Moles Epichlorohydrin | Time (mins.) | Viscosity | |
| 6 | Triethylenetetramine Plus Polyamine D | 0.069 0.17 | Ethanol | 0.74 | 33 | C–Gardner | 1 |
| 7 | Triethylenetetramine Plus Polyamine D | 0.069 1.17 | Isopropanol | 0.74 | 26 | E–Gardner | 1 |
| 8 | Tetraethylenepentamine | 0.24 | n-Butanol | 0.72 | 14 | C–Gardner | 3 |
| 9 | Triethylenetetramine Plus Polyamine D | 0.069 0.17 | sec-Butanol | 0.74 | 35 | do | 1 |
| 10 | Diethylenetriamine Plus Polyamine H | 0.204 0.036 | n-Hexanol | 0.24 | 120 | | 3 |

Example 11

To a 3-liter, four-necked flask equipped with a mechanical stirrer, thermometer, dropping funnel and condenser there were charged 154 grams (1.056 moles) of commercial triethylenetetramine and 618 grams (2.65 moles) of polyamine D and then a solution formed by dissolving 304 grams (3.1 moles) of maleic anhydride in 1454 grams of methanol, and heating on a steam bath for 30 minutes to convert the maleic anhydride to monomethyl maleate, was added dropwise to the flask. The temperature was maintained at about 55° C. by cooling and by controlling the rate of addition of the solution of monomethyl maleate in methanol. The mixture was then divided into two equal portions which were each charged to a 3-liter stainless steel high pressure bomb. After purging with nitrogen the bombs were sealed and then heated for 5 hours at 135° C. and a pressure of 135 to 145 p.s.i.g. while the contents were agitated by continuous rocking. The bombs were then cooled, the pressure released and the contents combined. This solution is hereafter designated as first stage reaction solution.

In order to evaluate the effect of the diluent employed in the second stage reaction, a second stage resin designated herein as number 11–A was prepared by adding 16.5 grams of the first stage reaction solution prepared above to 17 grams of methanol, heating to 55° C. and the adding 6.9 grams (0.075 mole) of epichlorohydrin in a dropwise manner over a 10 minute period, with the temperature maintained at about 55° C. by cooling and by controlling the rate of addition. The flask temperature was then increased to about 65° C. and held there until the solution viscosity equalled C–Gardner whereupon distilled water was added to reduce the solids content to 1 percent and the pH was adjusted to 4.6 by addition of concentrated hydrochloric acid.

In a substantially identical manner, second stage resins bottle was capped and vigorously shaken and became warm to the touch indicating that the reaction occurring was slightly exothermic. The mixture was allowed to stand for 24 hours at a temperature of about 20° C. and then distilled water was added to dilute to a solids content of 1 percent and the pH was adjusted to 4.6 by addition of concentrated hydrochloric acid.

Example 13

To a four-necked flask equipped with a mechanical stirrer, thermometer, dropping funnel and distillation head there were charged 16.5 grams of the first stage reaction solution of Example 11 and then the solution was heated and 75 percent of the methanol was removed by distillation. Distilled water was added to adjust the solids content to 20 percent and the flask temperature was adjusted to 45° C. whereupon 6.9 grams of epichlorohydrin were added dropwise over a 10 minute period, with the temperature maintained at 45° C. by cooling and by control of the rate of addition. After addition of the epichlorohydrin was completed, the flask temperature was increased to 95° C. and maintained at this level for 8 minutes, at which point the solution had attained a viscosity equal to E–Gardner. Distilled water was then added to dilute to a solids content of 1 percent and the pH was adjusted to 4.6 by addition of concentrated hydrochloric acid.

Example 14

Using the equipment described in Example 1, 10.0 grams (0.069 mole) of commercial triethylenetetramine and 40.0 grams (0.17 mole) of polyamine D were reacted with a solution prepared by dissolving 19.6 grams (0.20 mole) of maleic anhydride in 7.4 grams (0.12 mole) of ethylene glycol and heating for 30 minutes on a steam bath to convert the anhydride to the bis half ester of ethylene glycol. The mixture was heated to 125° C. and held at this temperature for 2 hours and 30 minutes, then cooled to 95° C., dissolved in distilled water and diluted to 20 percent solids. A second stage resin was prepared by adding 68.5 grams (0.74 mole) of epichlorohydrin and reacting at 75° C. for 9 minutes until a solution viscosity of E–Gardner was reached. Distilled water was added to dilute to a 1 percent solids content and the pH was adjusted to 4.6 by addition of concentrated hydrochloric acid.

*Example 15*

Using the equipment described in Example 1, 10.0 grams (0.069 mole) of commercial triethylenetetramine and 40.0 grams (0.17 mole) of polyamine D were reacted with a solution prepared by dissolving 19.6 grams (0.20 mole) of maleic anhydride in 100 milliliters of methanol and heating on a steam bath for 30 minutes to convert the anhydride to monomethyl maleate. The reaction was carried out under the same conditions described in Example 1 and the product dissolved in water and diluted to 20 percent solids concentration. After heating to 55° C., 82.6 grams (0.64 mole) of 1,3-dichloro-2-propanol were added dropwise over a 15 minute period with the flask temperature maintained at about 55° C. by heating. After addition of the 1,3-dichloro-2-propanol, the flask temperature was increased to 75° C. and held at this level for 1 hour and 50 minutes at which point the flask was cooled to 70° C. and 12.8 grams of potassium hydroxide were added. The temperature was then raised to 75° C. and held at this level for 8 minutes, at which time the solution had attained a viscosity of E–Gardner. Distilled water was then added to dilute to a solids content of 1 percent and the pH was adjusted to 4.6 by addition of concentrated hydrochloric acid.

*Example 16*

Using the equipment described in Example 1, 10.0 grams (0.069 mole) of commercial triethylenetetramine and 40.0 grams (0.17 mole) of polyamine D were reacted with a solution prepared by dissolving 19.6 grams (0.20 mole) of maleic anhydride in 25 grams of cyclohexanol and refluxing on a steam bath for 30 minutes to convert the maleic anhydride to monocyclohexyl maleate. The mixture was heated to 125° C. and held at this temperature for 2 hours and 30 minutes, whereupon the flask was cooled to below 100° C. and sufficient distilled water was added to give a solids concentration of 25 percent. The second stage resin was prepared by adding 68.5 grams (0.74 mole) of epichlorohydrin over a period of 30 minutes with the temperature at 55° C. and continuing the reaction at 75° C. until a solution viscosity of E–Gardner was reached. Distilled water was added to dilute to a 15 percent solids concentration and the pH was adjusted to 4.6 by addition of concentrated hydrochloric acid.

*Example 17*

Using the equipment described in Example 1, 38.6 grams of a solution prepared by heating 9.2 grams of glycerol and 29.4 grams of maleic anhydride together on a steam bath for 45 minutes to convert the maleic anhydride to glycerol trimaleate were added dropwise at 95° C. to a mixture of 10.0 grams (0.069 mole) of triethylenetetramine and 40.0 grams (0.17 mole) of polyamine D. The reaction was exothermic and by the time the addition was completed the flask temperature was 140° C. Almost immediately after the completion of the addition the reaction mixture became a rubber-like mass and this material was maintained at 125° C. for 2.5 hours by infrared heating and then distilled water was added to give a solids concentration of 25 percent. The second stage resin was prepared by adding 68.5 grams (0.74 mole) of epichlorohydrin over a period of 30 minutes with the temperature at 55° C. and continuing the reaction at 75° C. until the solution viscosity exceeded E–Gardner. Distilled water was added to dilute to a 15 percent solids concentration and the pH was adjusted to 4.6 by addition of concentrated hydrochloric acid.

The resins prepared in Examples 1 to 17 above were evaluated as paper wet-strength additives. In the evaluation procedure employed, a sample of moist pulp (unbleached kraft pulp) of sufficient size to provide 2.61 grams of bone dry pulp was diluted with distilled water to a pulp content of 1.6 percent by weight. The pulp slurry was then placed in a mechanical mixer, the wet-strength resin was added, and the pulp was agitated for a period of 15 minutes. After the agitation, the pulp slurry was placed in a handsheet mold, sufficient water was added to make a total slurry of 12 liters and a handsheet was prepared and dried. The resin was cured for a period of 3 hours at a temperature of 105° C. and then the handsheet was conditioned overnight at 23° C. and in an atmosphere with 50 percent relative humidity. Tensile strengths, both wet and dry, were measured on a table model Instron tensile tester; the tensile strength being defined as the force required to break a strip of paper having a standard width of 15 millimeters and being reported in kilograms/15 millimeters. The wet tensile strength was determined after soaking the sample in water for at least 16 hours. Results of the evaluation are presented in Table II below, with the wet tensile strength for a control sample that contained no wet-strength resin being included for comparison purposes:

TABLE II

| Test No. | Resin | Level of Addition [2] | Basis Weight [1] | Wet Tensile Strength (Kg./15 mm.) | Dry Tensile Strength (Kg./15 mm.) | Percent Wet Strength [3] |
|---|---|---|---|---|---|---|
| Control | None | | 46.5 | 0.24 | 6.0 | 4 |
| 1 | Ex. 1 | 1.0 | 46.6 | 2.52 | 7.8 | 32 |
| 2 | Ex. 2 | 1.0 | 44.7 | 2.29 | 6.94 | 33 |
| 3 | Ex. 3 | 1.0 | 45.6 | 2.43 | 6.94 | 35 |
| 4 | Ex. 4 | 1.0 | 51.3 | 2.89 | 8.51 | 34 |
| 5 | Ex. 5 | 1.0 | 44.4 | 2.28 | 7.13 | 32 |
| 6 | Ex. 6 | 1.0 | 45.9 | 2.26 | 7.59 | 30 |
| 7 | Ex. 7 | 1.0 | 48.5 | 2.30 | 7.67 | 30 |
| 8 | Ex. 8 | 1.0 | 47.8 | 2.44 | 7.17 | 34 |
| 9 | Ex. 9 | 1.0 | 45.6 | 2.31 | 7.24 | 32 |
| 10 | Ex. 10 | 1.0 | 47.8 | 1.80 | 6.67 | 27 |
| 11 | Ex. 11–A | 1.0 | 47.1 | 2.25 | 7.1 | 32 |
| 12 | Ex. 11–B | 1.0 | 47.2 | 2.42 | 7.38 | 33 |
| 13 | Ex. 11–C | 1.0 | 45.9 | 2.53 | 7.34 | 35 |
| 14 | Ex. 11–D | 1.0 | 45.4 | 2.48 | 7.52 | 33 |
| 15 | Ex. 11–E | 1.0 | 45.5 | 2.18 | 7.3 | 30 |
| 16 | Ex. 11–F | 1.0 | 46.1 | 2.41 | 7.83 | 31 |
| 17 | Ex. 11–G | 1.0 | 47.8 | 2.50 | 7.6 | 33 |
| 18 | Ex. 11–H | 1.0 | 45.2 | 2.44 | 7.82 | 31 |
| 19 | Ex. 12 | 1.0 | | 2.18 | 6.94 | 31 |
| 20 | Ex. 13 | 1.0 | | 2.21 | 7.35 | 30 |
| 21 | Ex. 14 | 1.0 | | 2.32 | 7.39 | 31 |
| 22 | Ex. 15 | 1.0 | | 1.57 | 7.21 | 22 |
| 23 | Ex. 16 | 1.0 | 46.1 | 2.11 | 6.4 | 33 |
| 24 | Ex. 17 | 1.0 | 44.6 | 1.96 | 6.7 | 30 |

[1] Weight in pounds of a standard ream containing 500 sheets, each sheet being 25 x 38 inches.
[2] Percent by weight of dry pulp based on active solids in resin.
[3] Percent wet strength = $\frac{\text{Wet tensile strength}}{\text{Dry tensile strength}} \times 100$.

Consideration of the above results indicates that variation in the components from which the resin was prepared or in the specific operating conditions employed in the various examples had, in general, only a moderate influence on the effectiveness of the resin as a wet strength agent and that in every instance the resin effected a several fold increase in the wet strength of the paper.

*Example 18*

Each of four 25-lb. batches of unbleached kraft paper were soaked in water for 48 hours, drained, and then agitated in a hydrapulper together with 50 gallons of water for 15 minutes. The paper was then transferred to the beater of a 12 inch paper machine (two 25-lb. batches per beater load), washed, diluted with water to a consistency of 4 to 4.5 percent and then beaten to a Canadian Standard Freeness (TAPPI Standard T–227M–58) of about 545 and pumped into the beater chest. The consistency was then adjusted to 2.05 percent and 1 percent rosin size, based on dry pulp, was added. After a 16 hour period had elapsed, 2 percent alum, based on dry pulp, was added and the pulp slurry was transferred to the machine chest. The paper machine was operated for a sufficient period to provide constant conditions and then a poly-β-asparaginepolyalkylenepolyamine resin prepared in the manner described in Example 2, except that the polyalkylene polyamine employed was a mixture of 20 percent by weight commercial triethylenetetramine and 80 percent by weight polyamine D, was added at the machine chest in sufficient quantity to give a 0.25 percent by weight resin concentration based on dry pulp. No operating problems developed as a result of the addition of the resin and the solids content of the white water was noticeably reduced and the clarity greatly improved. After about 30 minutes of operation, additional resin was added to increase the concentration to 1 percent based on the weight of dry pulp. In contrast to the results with a commercial wet strength resin operated under identical conditions for comparison purposes, no picking occurred at the first press roll. Approximately 30 pounds of paper were prepared at each resin level with a basis weight of approximately 120 lbs. Samples were taken and the wet and dry tensile strengths determined in the same manner as described above following Example 17, except that the curing period was 1 hour at 105° C. Results obtained were as follows:

| Test No. | Level of Addition | Wet Tensile Strength (Kg./15 mm.) | Dry Tensile Strength (Kg./15 mm.) | Percent Wet Strength |
|---|---|---|---|---|
| Control | | 1.16 | 15.1 | 8 |
| 25 | 0.25 | 2.99 | 16.4 | 18 |
| 26 | 1.00 | 4.42 | 18.5 | 24 |

*Example 19*

Several 2-liter samples of a 0.1 percent consistency bleached kraft pulp slurry (Canadian Standard Freeness of 475) were prepared, the pH values adjusted and varying amounts of the poly-β-asparaginepolyalkylenepolyamine resin of Example 18 were added. After vigorous agitation, each sample was allowed to stand for 10 minutes and then 1 liter of the supernatant liquid was removed by decantation. The percentage light transmittance of each sample was then determined using a Bausch and Lomb Spectronic 20 colorimeter at a wave length of 450 millimicrons and compared with that of distilled water and the resin-free pulp slurry. The test conditions and results are summarized in Table III below:

TABLE III

| Test No. | pH | Level of Addition (Percent) | Percent Light Transmittance |
|---|---|---|---|
| Control (distilled water) | | | 100 |
| Control (resin-free pulp) | | | 82 |
| 27 | 4.5 | 0.1 | 91 |
| 28 | 6.0 | 0.2 | 94 |
| 29 | 8.0 | 0.2 | 88 |
| 30 | 4.5 | 0.05 | 85 |
| 31 | 6.0 | 0.4 | 97 |
| 32 | 8.0 | 0.4 | 93 |

The above results illustrate the ability of the poly-β-asparaginepolyalkylenepolyamine resins of this invention to act as flocculents or clarifiers for pulp slurries.

*Example 20*

Using the equipment described in Example 1, 40 grams (0.172 mole) of polyamine D and 10 grams (0.068 mole) of triethylenetetramine were reacted with 26.4 grams (0.05 mole) of pentaerythritol tetramaleate in 75 milliliters of 1,4-dioxane. The pentaerythritol tetramaleate was prepared by blending maleic anhydride and pentaerythritol as dry powders and then heating the mixture to 145–150° C. The temperature was maintained at 150° C. for 20 minutes. The product was a clear, viscous liquid which was soluble in 1,4-dioxane. The amine-maleate reaction mixture was slowly heated to 100–105° C. and the 1,4-dioxane was removed by distillation as the kettle temperature gradually increased to 125° C. At this point the system was placed under reduced pressure (100 millimeters of Hg) for 15 minutes, and then the pressure was further reduced to 15–20 millimeters of mercury and held there for 30 minutes. After the 30 minute period the vacuum was released and the temperature was maintained at 125° C. for an additional 1 hour and 45 minutes. The product was then dissolved in distilled water and diluted to 25 percent solids. The flask temperature was then adjusted to 55° C. and epichlorohydrin (68.5 grams, 0.74 mole) was added dropwise over a 40 minute period with the flask temperature maintained at 55° C. by cooling. After the addition was complete the flask temperature was increased to 75° C. and maintained there until the solution viscosity of the materials exceeded E–Gardner. At this point distilled water was added to give a solids content of 1 percent and the pH was adjusted to 4.6 by addition of concentrated hydrochloric acid. The resin was evaluated as a wet-strength agent in the same manner as described above following Example 17 except that the curing period was 3 minutes at 105° C. Results obtained were as follows:

| Test No. | Level of Addition | Basis Weight | Wet Tensile Strength (Kg./15 mm.) | Dry Tensile Strength (Kg./15 mm.) | Percent Wet Strength |
|---|---|---|---|---|---|
| 33 | 1.0 | 46.0 | 1.7 | 6.1 | 28 |

*Example 21*

Using the equipment described in Example 1, 40 grams (0.172 mole) of polyamine D and 10 grams (0.068 mole) of triethylenetetramine were reacted with 36.6 grams (0.2 mole) of crotyl maleate in 100 millimeters of 1,4-dioxane. The crotyl malate was prepared by dissolving maleic anhydride and crotyl alcohol in 100 milliliters of 1,4-dioxane and heating the solution at 65° C. for 45 minutes. The amine-maleate reaction mixture was heated to 100–105° C. and the 1,4-dioxane was removed by distillation. The flask temperature gradually increased to 125° C. and the system was placed under reduced pressure (100 millimeters of Hg) for 15 minutes and then the pressure was decreased to 15–20 millimeters of mercury and maintained at this level for 30 minutes. The vacuum was released at this point and the temperature was maintained at 125° C. for an additional 105 minutes. The product was dissolved in distilled water and diluted to a 25 percent solids content. The flask temperature was adjusted to 55° C. and epichlorohydrin (68.5 grams, 0.74 mole) was added dropwise over a 20 minute period with the flask temperature maintained at 55° C. by cooling. When the addition was complete the flask temperature was increased to 75° C. and maintained at this temperature until the solution viscosity of the material exceeded E-Gardner. At this point distilled water was added to give a solids content of 1 percent and the pH was adjusted to 4.6 by addition of concentrated hydrochloric acid. The resin was evaluated as a wet-strength agent in the same manner as described above following Example 17, except that the curing period was 3 minutes at 105° C. Results obtained were as follows:

| Test No. | Level of Addition | Basis Weight | Wet Tensile Strength (Kg./15 mm.) | Dry Tensile Strength (Kg./15 mm.) | Percent Wet Strength |
| --- | --- | --- | --- | --- | --- |
| 34 | 1.0 | 46.4 | 1.51 | 7.4 | 20 |

Various changes and modifications can be made in practicing the present invention without departing from the spirit and scope thereof so that the invention is not to be limited except insofar as such limitations are specified in the following claims.

What is claimed is:

1. The cationic water-soluble resinous reaction product of (a) a polyfunctional halohydrin and (b) a resin produced by reaction at a temperature of about 60° C. to 150° C. of about 0.5n to about 2n moles of a polyalkylenepolyamine per mole of a compound of the formula:

$$R \left[ -O-\overset{O}{\underset{\|}{C}}-CH=CH-\overset{O}{\underset{\|}{C}}-OH \right]_n$$

wherein $n$ is an integer having a value of from 1 to 6 and R is the hydrocarbon residue of an aliphatic alcohol containing 1 to 8 carbon atoms and has a valence equal to $n$, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C.

2. The cationic water-soluble resinous reaction product of (a) a polyfunctional halohydrin and (b) a resin produced by reaction at a temperature of about 115° C. to about 135° C. of about 0.8n to about 1.4n moles of a polyalkylenepolyamine per mole of a compound of the formula:

$$R \left[ -O-\overset{O}{\underset{\|}{C}}-CH=CH-\overset{O}{\underset{\|}{C}}-OH \right]_n$$

wherein $n$ is an integer having a value of from 1 to 6 and R is the hydrocarbon residue of an aliphatic alcohol containing 1 to 8 carbon atoms and has a valence equal to $n$, the molar ratio of said polyfunctional halohydrin to secondary amine groups of said resin being from about 0.8 to about 1.1 and the reaction of said polyfunctional halohydrin and said resin being conducted at a temperature of from about 40° C. to about 80° C.

3. The cationic water-soluble resinous reaction product of (a) epichlorohydrin and (b) a resin produced by reaction at a temperature of about 60° C. to about 150° C. of about 0.5 to about 2 moles of a polyalkylenepolyamine per mole of a monoalkyl maleate of the formula:

$$R'-O-\overset{O}{\underset{\|}{C}}-CH=CH-\overset{O}{\underset{\|}{C}}-OH$$

wherein R′ is an alkyl group of 1 to 6 carbon atoms, the molar ratio of epichlorohydrin to secondary amine groups of said resin being from about 0.5 to about 1.5 and the reaction of said epichlorohydrin and said resin being conducted at a temperature of from about 20° C. to about 100° C.

4. The cationic water-soluble resinous reaction product of (a) epichlorohydrin and (b) a resin produced by reaction at a temperature of about 115° C. to about 135° C. of about 0.8 to about 1.4 moles of a polyalkylenepolymer per mole of a monoalkyl maleate of the formula:

$$R'-O-\overset{O}{\underset{\|}{C}}-CH=CH-\overset{O}{\underset{\|}{C}}-OH$$

wherein R′ is an alkyl group of 1 to 6 carbon atoms, the molar ratio of epichlorohydrin to secondary amine groups of said resin being from about 0.8 to about 1.1 and the reaction of said epichlorohydrin and said resin being conducted at a temperature of from about 40° C. to about 80° C.

5. The cationic water-soluble resinous reaction product of (a) epichlorohydrin and (b) a resin produced by reaction at a temperature of about 60° C. to about 150° C. of about 0.5 to about 2 moles of a polyalkylenepolyamine per mole of monomethyl maleate, the molar ratio of epichlorohydrin to secondary amine groups of said resin being from about 0.5 to about 1.5 and the reaction of said epichlorohydrin and said resin being conducted at a temperature of from about 20° C. to about 100° C.

6. The cationic water-soluble resinous reaction product of (a) epichlorohydrin and (b) a resin produced by reaction at a temperature of about 115° C. to about 135° C. of about 0.8 to about 1.4 moles of a polyalkylenepolyamine per mole of monomethyl maleate, the molar ratio of epichlorohydrin to secondary amine groups of said resin being from about 0.8 to about 1.1 and the reaction of said epichlorohydrin and said resin being conducted at a temperature of from about 40° C. to about 80° C.

7. The cationic water-soluble resinous reaction product of (a) epichlorohydrin and (b) a resin produced by reaction at a temperature of about 115° C. to about 135° C. of about 0.8 to about 1.4 moles of tetraethylenepentamine per mole of monomethyl maleate, the molar ratio of epichlorohydrin to secondary amine groups of said resin being from about 0.8 to about 1.1 and the reaction of said epichlorohydrin and said resin being conducted at a temperature of from about 40° C. to about 80° C.

8. In the manufacture of paper products from cellulosic paper-making fibers, the improvement which comprises incorporating in said fibers from about 0.05 to about 5 percent, based on the weight of said fibers, of a cationic water-soluble resinous reaction product of (a) a polyfunctional halohydrin and (b) a resin produced by reaction at a temperature of about 60° C. to 150° C. of about 0.5n to about 2n moles of a polyalkylenepolyamine per mole of a compound of the formula:

$$R \left[ -O-\overset{O}{\underset{\|}{C}}-CH=CH-\overset{O}{\underset{\|}{C}}-OH \right]_n$$

wherein $n$ is an integer having a value of from 1 to 6 and R is the hydrocarbon residue of an aliphatic alcohol containing 1 to 8 carbon atoms and has a valence equal to $n$, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C., and subsequently applying heat to cure said resinous reaction product to a water-insoluble form.

9. A paper product of improved wet strength comprising cellulosic paper-making fibers containing from about 0.05 to about 5 percent, based on the weight of said fibers, of a cationic resinous composition obtained by reacting (a) a polyfunctional halohydrin with (b) a resin produced by reaction at a temperature of about 60° C. to 150° C. of about $0.5n$ to about $2n$ moles of a polyalkylenepolyamine per mole of a compound of the formula:

$$R \!\!-\!\!\left[\!\!\begin{array}{c} O \\ \| \\ O\!-\!C\!-\!CH\!=\!CH\!-\!C\!-\!OH \\ \| \\ O \end{array}\!\!\right]_n$$

wherein $n$ is an integer having a value of from 1 to 6 and R is the hydrocarbon residue of an aliphatic alcohol containing 1 to 8 carbon atoms and has a valence equal to $n$, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C., to produce a water-soluble reaction product and subsequently applying heat to cure said reaction product to a water-insoluble form.

10. A method for the flocculation of dispersed solid matter in an aqueous anionic suspension which comprises admixing in said suspension from about 0.01 to about 5 percent by weight based upon said dispersed solid matter of the cationic water-soluble resinous reaction product of (a) a polyfunctional halohydrin and (b) a resin produced by reaction at a temperature of about 60° C. to 150° C. of about $0.5n$ to about $2n$ moles of a polyalkylenepolyamine per mole of a compound of the formula:

$$R \!\!-\!\!\left[\!\!\begin{array}{c} O \\ \| \\ O\!-\!C\!-\!CH\!=\!CH\!-\!C\!-\!OH \\ \| \\ O \end{array}\!\!\right]_n$$

wherein $n$ is an integer having a value of from 1 to 6 and R is the hydrocarbon residue of an aliphatic alcohol containing 1 to 8 carbon atoms and has a valence equal to $n$, the molar ratio of said polyfunctional halohydrin to secondary amine groups of said resin being from about 0.5 to about 1.5 and the reaction of said polyfunctional halohydrin and said resin being conducted at a temperature of from about 20° C. to about 100° C.

11. A method for the flocculation of dispersed solid matter in an aqueous anionic suspension which comprises admixing in said suspension from about 0.1 to about 2.5 percent by weight based upon said dispersed solid matter of the cationic water-soluble resinous reaction product of (a) epichlorohydrin and (b) a resin produced by reaction at a temperature of about 60° C. to about 150° C. of about 0.5 to about 2 moles of a polyalkyleneamine per mole of monomethyl maleate, the molar ratio of epichlorohydrin to secondary amine groups of said resin being from about 0.5 to about 1.5 and the reaction of said epichlorohydrin and said resin being conducted at a temperature of from about 20° C. to about 100° C.

References Cited
UNITED STATES PATENTS

| | | | |
|---|---|---|---|
| 2,926,154 | 2/1960 | Keim | 162—164 X |
| 3,086,961 | 4/1963 | House et al. | 162—164 X |

S. LEON BASHORE, *Primary Examiner.*